(12) United States Patent
Chakravarthy et al.

(10) Patent No.: US 8,126,892 B2
(45) Date of Patent: Feb. 28, 2012

(54) AUTOMATICALLY LINKING DOCUMENTS WITH RELEVANT STRUCTURED INFORMATION

(75) Inventors: Venkat Chakravarthy, New Delhi (IN);
Himanshu Gupta, New Delhi (IN);
Mukesh K. Mohania, New Delhi (IN);
Prasan Roy, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/018,547

(22) Filed: Feb. 1, 2011

(65) Prior Publication Data
US 2011/0131216 A1    Jun. 2, 2011

Related U.S. Application Data

(63) Continuation of application No. 11/530,104, filed on Sep. 8, 2006, now Pat. No. 7,899,822.

(51) Int. Cl.
*G06F 17/30* (2006.01)
*G06F 7/00* (2006.01)

(52) U.S. Cl. .................. 707/736; 707/705; 707/802
(58) Field of Classification Search .......... 707/705, 707/736, 802
See application file for complete search history.

(56) References Cited

U.S. PATENT DOCUMENTS

| | | |
|---|---|---|
| 5,778,405 A * | 7/1998 | Ogawa .................. 715/259 |
| 6,094,649 A | 7/2000 | Bowen et al. |
| 6,182,066 B1 | 1/2001 | Marques |
| 6,185,550 B1 * | 2/2001 | Snow et al. .................. 1/1 |
| 6,195,678 B1 * | 2/2001 | Komuro .................. 709/202 |
| 6,317,708 B1 | 11/2001 | Witbrock et al. |
| 6,356,922 B1 | 3/2002 | Schilit et al. |
| 6,370,551 B1 | 4/2002 | Golovchinsky et al. |
| 6,446,066 B1 | 9/2002 | Horowitz |
| 6,507,857 B1 | 1/2003 | Yalcinalp |
| 6,571,240 B1 | 5/2003 | Ho et al. |
| 6,594,658 B2 * | 7/2003 | Woods .................. 1/1 |
| 6,658,626 B1 | 12/2003 | Aiken |
| 6,785,670 B1 | 8/2004 | Chiang et al. |
| 6,792,414 B2 | 9/2004 | Chaudhuri et al. |
| 6,801,904 B2 | 10/2004 | Chaudhuri et al. |

(Continued)

FOREIGN PATENT DOCUMENTS

WO    2005098683 A2    10/2005

OTHER PUBLICATIONS

Berrios, Daniel C., et al., "Methods for Semi-automated Indexing for High Precision Information Retrieval", Journal of the American Medical Informatics Association, vol. 9, No. 6, Nov./Dec. 2002, pp. 637-652.*

(Continued)

*Primary Examiner* — Robert Stevens
(74) *Attorney, Agent, or Firm* — Gibb I.P. Law Firm, LLC; Derek S. Jennings (57) ABSTRACT

A method of associating a given text document with relevant structured data is disclosed. The method receives as inputs a text document, and structured data in the form of a relational database. The method then identifies terms in the text document, and searches and queries the structured data using the terms to identify fragments of the structured data that are relevant to the document. Finally, the text document and the identified fragments of structured data are output to a user.

6 Claims, 9 Drawing Sheets

U.S. PATENT DOCUMENTS

| | | | |
|---|---|---|---|
| 6,970,881 | B1 | 11/2005 | Mohan et al. |
| 7,401,077 | B2 | 7/2008 | Bobrow et al. |
| 7,421,155 | B2 | 9/2008 | King et al. |
| 2001/0000356 | A1 | 4/2001 | Woods |
| 2004/0243556 | A1* | 12/2004 | Ferrucci et al. .................. 707/3 |
| 2005/0027687 | A1 | 2/2005 | Nowitz |
| 2005/0267871 | A1 | 12/2005 | Marchisio et al. |
| 2006/0004725 | A1 | 1/2006 | Abraido-Fandino |
| 2006/0009966 | A1* | 1/2006 | Johnson et al. ................. 704/10 |
| 2006/0010112 | A1 | 1/2006 | Crivat |
| 2006/0050996 | A1 | 3/2006 | King et al. |
| 2006/0230015 | A1 | 10/2006 | Gupta |
| 2007/0038643 | A1* | 2/2007 | Epstein ........................... 707/10 |
| 2007/0078889 | A1 | 4/2007 | Hoskinson |
| 2007/0094285 | A1 | 4/2007 | Agichtein et al. |
| 2007/0179776 | A1 | 8/2007 | Segond et al. |
| 2007/0192306 | A1 | 8/2007 | Papakonstantinou et al. |

OTHER PUBLICATIONS

Ramakrishnan et al., "A Framework for Schema-Driven Relationship Discovery from Unstructured Text," ISWC 2006, pp. 583-596.

Liu et al., "Effective Keyword Search in Relational Databases," SIGMOD 2006, pp. 563-574, ABS.

Yu et al., "Keyword Join: Realizing Keyword Search for Information Integration," DSpace@MIT, Singapore-MIT Alliance (SMA), Jan. 2006, pp. 1-9.

Graupmann et al., "The SphereSearch Engine for Unified Ranked Retrieval of Heterogeneous XML and Web Documents," Proc. Of the 31st VLDB Conference, 2005, pp. 529-540.

Schatz, "The Interspace: Concept Navigation Across Distributed Communities," Computer, Jan. 2002, pp. 54-62.

Litkowski, "Question-Answering Using Semantic Relation Tuples," TREC-8, 1999, pp. 349-356.

Daume III et al, "Induction of Word and Phrase Alignments for Automatic Document Summarization," Computational Linguistics, vol. 31, Issue 4, Dec. 2005, pp. 505-530.

Ravishankar et al, "A Modular Approach to Document Indexing and Semantic Search," WTAS 2005, pp. 1-6.

Litkowski, "Summarization Experiments in DUC 2004," Document Understanding Workshop, 2004, pp. 1-8.

Ceglowski et al., "Semantic Search of Unstructured Data Using Contextual Network Graphs," 2003, pp. 1-11, ABS.

Agrawal et al., "DBXplorer: A System for Keyword-based Search over Relational Databases," Proceedings for the 18th International Conference of Data Engineering, 2002, pp. 5-16.

Cowie et al., "Information Extraction," Communications of the ACM, 39(1), 1996, pp. 80-91.

Grishman, "Information Extraction: Techniques and Challenges," International Summer School on Information Extraction, LNCS 1299, 1997, pp. 10-27.

Hristidis et al, "Efficient IR-Style Keyword Search over Relational Databases," Proceedings of the 29th International Conference on Very Large Databases, 2003, pp. 850-861.

Hristidis et al., "Discover: Keyword Search in Relational Databases," Proceedings of the 28th International Conference on Very Large Databases, 2002, pp. 670-681.

Li et al., "Semantic integration in text: From ambiguous names to identifiable entities," AI Magazine, v 26, n 1, Spring 2005, pp. 45-58.

De Arantes et al., "XML-based document to query a relational database," ICEIS, Apr. 2002, pt. 1, pp. 26-33, vol. 1.

Carmel et al., "Searching XML Documents via XML Fragments," SIGIR 2003, pp. 151-158, ABS.

Goldberg et al., "Using Collaborative Filtering to Weave an Information Tapestry," Communications of the ACM, vol. 35, No. 12, Dec. 1992, pp. 61-70.

Shanmugasundaram et al., "Efficiently Publishing Relational Data as XML Documents," The VLDB Journal, vol. 10, 2001, pp. 133-154.

Kao et al., "Wisdom: Web Intrapage Informative Structure Mining Based on Document Object Model," IEEE Transactions on Knowledge and Data Engineering, vol. 17, No. 5, May 2005, pp. 614-627.

Theobald et al., "Classification and Focused Crawling for Semistructured Data," Intelligent Search on XML Data, LNCS 2818, 2003, pp. 145-157, ABS.

Tanev et al., "Exploiting Linguistic Indices and Syntactic Structures for Multilingual Question Answering: ITC-irst at CLEF 2005," CLEF 2005, 2006, pp. 390-399.

Chakravarthy et al., U.S. Appl. No. 11/530,104, Office Action Communication, Nov. 12, 2008, 15 pages.

Chakravarthy et al., U.S. Appl. No. 11/530,104, Office Action Communication, Mar. 2, 2010, 15 pages.

Chakravarthy et al., U.S. Appl. No. 11/530,104, Office Action Communication, Aug. 19, 2010, 12 pages.

Chakravarthy et al., U.S. Appl. No. 11/530,104, Notice of Allowance, Oct. 22, 2010, 3 pages.

* cited by examiner

I am a business person in the city of Kolkatta. For the last couple of months, I have been feeling severe chest pain. Pain worsens on exercise. Nowadays, even my daily morning walk results in shortness of breath and at the end I feel like fainting. I am frequently getting headaches and last month I had a fever twice. Nowadays, I just take juices with a couple of bread pieces as my breakfast. My lunch comprises of homemade roti and daal. In the evening, I prefer to have kichadi. I have totally abandoned taking hard food as a precaution. It looks like my indigestion is on the rise.

Procedure BESTANNOT($D$)
Input: Document $D$
Output: (best annotation, score)
Begin
A01 Let $((F_0, B_0), s_0) = ((\phi, \bot), 0)$
A02 For $i = 1$ to $|D|$
A03     Let $s_i = -\infty$
A04 Return BESTSEGANNOT($|D|$)
End Procedure BESTSEGANNOT($i$)
Input: Segment $D_{1:i}$, specified by index $i$
Output: (best annotation, score)
Begin
B01 If $s_i > -\infty$ // already computed
B02     Return $((F_i, B_i), s_i)$
B03 For $k = 0$ to $i - 1$
B04     Let $((F_k, B_k), s_k) = $ BESTSEGANNOT($k$)
B05     Let $e = \arg\max_{e \in E} score(e, D_{(k+1):i})$
B06     Let $s = s_k + score(e, D_{(k+1):i}) - \lambda$
B07     If $s_i < s$
B08         Let $s_i = s$
B09         Let $F_i = F_k \cup \{e\}$
B10         If $e \notin F_k$
B11             Let $B_i(e) = \{D_{(k+1):i}\}$
B12         Else Let $B_i(e) = B_k(e) \cup \{D_{(k+1):i}\}$
B13 Return $((F_i, B_i), s_i)$
End

Fig. 6

Procedure BestAnnotIncr($D$)
Input: Document $D$
Output: (best annotation, score)
Begin
C01 Initialize the context cache as empty
C02 Let $((\bar{F}, \bar{B}), s) = \text{BestAnnot}_C(D)$
C03 While $slack_C(\bar{F}, \bar{B}) > 0$
C04     Call UpdateCache($\bar{F}, \bar{B}$)
C05     Let $((\bar{F}, \bar{B}), s) = \text{BestAnnot}_C(D)$
C06 Return $((\bar{F}, \bar{B}), s)$
End

Fig. 7

Procedure UPDATECACHE($\bar{F}, \bar{B}$)
Input: annotation
Begin
D01 Let $(\bar{e}, \bar{d})$ = arg max$_{e \in \bar{F}, d \in \bar{B}(e)}$ slack$(d, e)$
D02 If $\sum_{t \in T(\bar{d}) - T'_{\bar{e}}} tf(t, \bar{d}).w(t) \geq score_{\bar{D}}(\bar{e}, \bar{d})$
D03     Let $\bar{t}$ = arg max$_{t \in R(\bar{e}, \bar{d})} tf(t, \bar{d}).w(t)$
D04     Call *GetEntitySet*($\bar{t}$)
D05 Else Call *GetTermSet*($\bar{e}$)
End

AUTOMATICALLY LINKING DOCUMENTS WITH RELEVANT STRUCTURED INFORMATION

CROSS-REFERENCE TO RELATED APPLICATIONS

This application is a Continuation of U.S. application Ser. No. 11/530,104 filed Sep. 8, 2006, the complete disclosure of which, in its entirety, is herein incorporated by reference.

FIELD OF THE INVENTION

The present invention relates generally to information extraction and, in particular, to discovering entities hidden in a given document with respect to a given relational database.

BACKGROUND

Faced with growing knowledge management needs, enterprises are increasingly realizing the importance of seamlessly integrating, or interlinking, critical business information distributed across structured and unstructured data sources. However, in a typical enterprise environment, the structured data is managed by the database system and the unstructured data is managed by the content manager creating an artificial separation between the two. This separation is unfortunate since the information contents of these two data sources are complementary and related. Interlinking the unstructured documents with related structured data enables consolidated analysis of information spread across the two sources.

Prior work on information extraction has dealt with the issue of discovering real world entities pertaining to a given document. Named Entity Recognition (NER) systems focus on the task of identifying sequences of terms within a document as named-entities such as person name, location and company name. Such systems employ natural language processing techniques and use dictionaries for performing the above task. However, these solutions are prone to an element of uncertainty, since entities are not well defined. Moreover, only entities that are explicitly mentioned in the document may be identified by these approaches.

Conventionally, the structured data is accessed via a precise query interface, such as using a Structured Query Language (SQL) and unstructured data is accessed through keyword search. Recent work on information integration have proposed keyword search over structured data. In this solution, the input is a set of keywords and the goal is to identify sets of related tuples from the structured data that contain one or more of the keywords. This body of work deals with plain keyword search over structured data. Such solutions do not address the problem of discovering fragments of structured data related to a text document.

A need therefore exists for an improved system that is able discover entities within structured data that are related to a given text document. The system strives to provide a unified view of unstructured and structured data and enables consolidated analysis and information retrieval across the two sources.

SUMMARY

It is an object of the present invention to substantially overcome, or at least ameliorate, one or more disadvantages of existing arrangements.

According to an aspect of the invention a method of associating a given text document with relevant structured data is disclosed. The method receives as inputs a text document, and structured data in the form of a relational database.

The method then identifies terms in the text document, and searches and queries the structured data using the terms to identify fragments of the structured data that are relevant to the document. Finally, the text document and the identified fragments of structured data are output to a user.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
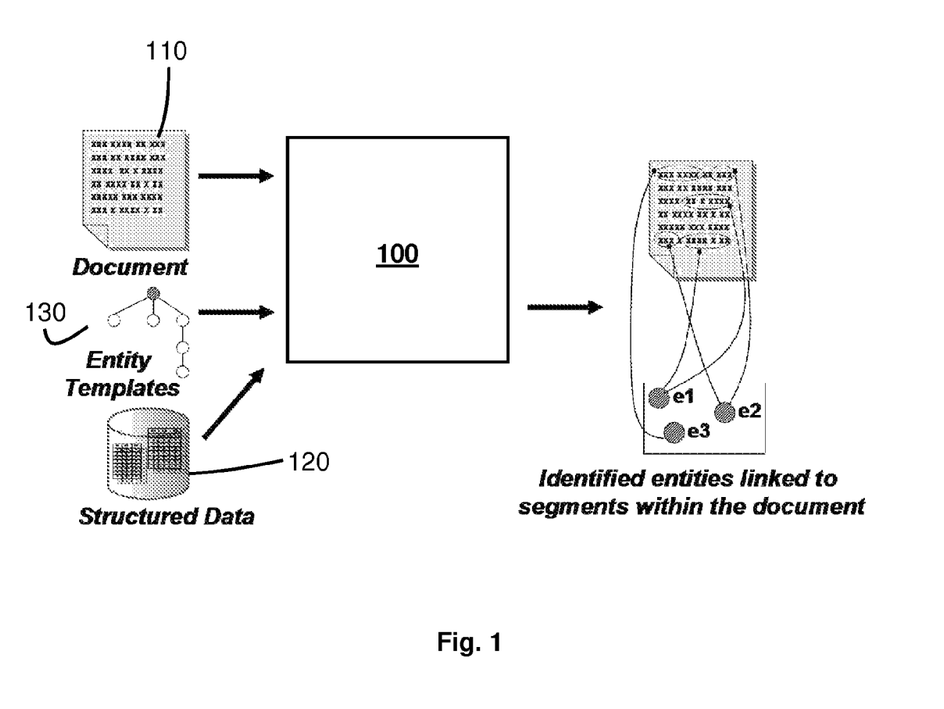
FIG. 1 shows a schematic block diagram including a system for linking a given text document with relevant structured data according to the present disclosure.

Disclosed is a system 100 and a method 200 for linking a given text document with relevant structured data. FIG. 1 shows a schematic block diagram including the system 100 according to the present disclosure. The system 100 receives as input a text document 110, and structured data 120. The structured data 120 is in a relational database. The structured data 120 is viewed as a set of predefined entities and associated context information.

An entity is a "thing" of significance, either real or conceptual, about which the relational database 120 holds information. An entity template 130, also received by the system 100, specifies (a) the entities to be matched in the document 110 and (b) the context information that can be exploited to perform the match.

The system 100 identifies the entities (from the set of entities specified by the entity template 130) that best match the document 110 and further finds embeddings of these entities in the document. The embedding of each entity provides a set of segments within the document 110 that are related to the entity. The system 100 outputs the document 110 associated with the identified entities and their embeddings.

Figure 4:
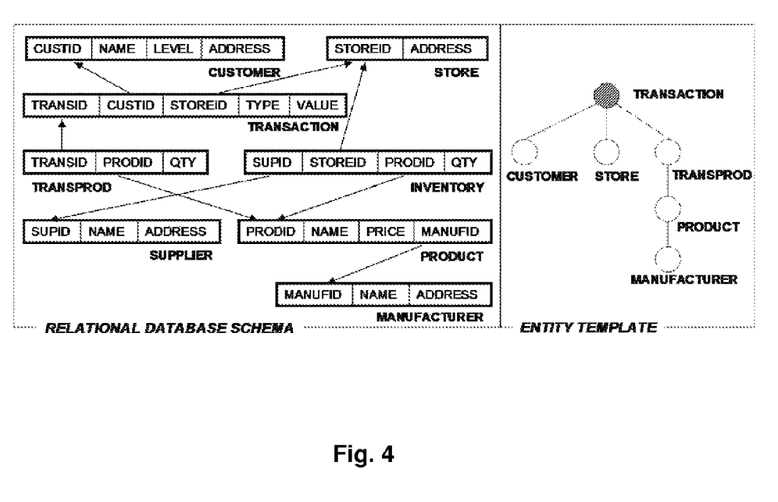
FIG. 4 shows another example of an entity template.

As an example, consider a retail organization where the structured data consists of all information about sales transactions, customers and products. An example schema of the relational database of the organization is shown in FIG. 4. The organization, with a network of multiple stores, has a steady inflow of complaints into a centralized complaint repository. These complaints are accepted using alternative means, such as a web-form, email, fax and voice-mail (which is then transcripted). Each such complaint is typically a free-flow narrative text about one or more sales transactions, and is not guaranteed to contain the respective transaction identifiers. Instead, each complaint may divulge, by way of context, limited information such as the store name, a partial list of items bought, the purchase dates, etc. Using this limited information, the system 100 discovers the potential matches with the transactions present in the sales transactions database and associates the given complaint with the matching transactions.

Such linkage provides actionable context to a typically fuzzy, free flow narrative which can be profitably exploited in a variety of ways:

In the above example, an automated complaint routing system may be built. Given that the transaction is automatically linked with the complaint, such an automated complaint routing system retrieves from the relational database additional information about the transaction (such as type and value of the items purchased, specific promotions availed and the customer's loyalty level), and routes the complaint to an appropriate department or customer service representative based on the same.

Consider a collection of complaints that have been linked to the respective transactions in the relational database. This association can be exploited in On Line Analytical Processing (OLAP) to derive useful information, such as regions or product categories that have shown a recent upsurge in complaints.

The system 100, in order to find the best annotation, makes use of entity templates 130 provided by a domain expert or a user. An entity template 130 specifies (a) the entities to be matched in the document 110 and (b) the context information that can be exploited to perform the match.

Formally, an entity template 130 is a rooted tree with a designated root node. Each node in the rooted tree is labelled with a table in the schema of the given relational database 120, and there exists an edge in the tree only if the tables labelling the nodes at the two ends of the edge have a foreign-key relationship in the database schema. The table that labels the root node is called the pivot table of the entity template 130, and the tables that label the other nodes are called the context tables. Each row in the pivot table is identified as an entity belonging to the template 130, with the associated context information consisting of the rows in the context tables that have a path to that row in the pivot table through one or more foreign-keys covered by the edges in the entity template 130.

In order to illustrate the above, consider the entity template shown in FIG. 4. The entity template, which is a sales transactions entity template, has its root node labelled by a TRANSACTION table (the pivot table), and its non-root nodes labelled by CUSTOMER, STORE, TRANSPROD, PRODUCT and MANUFACTURER tables (the context tables) that provide the context for each transaction in the TRANSACTION table. Note that the template definition also provides the information that the SUPPLIER table, though reachable from the TRANSACTION table via both the PRODUCT and STORE tables, carries no contextual information about a given transaction.

Multiple nodes in the template may be labelled with the same table. This is needed to differentiate the different roles a table might play in the context of the entity. Suppose the document 110 mentions product names not only to identify a transaction, but also to identify the store in which the transaction occurred. Further, suppose the document 110 mentions the manufacturer in the former case, but not in the latter. Then, the template in FIG. 4 would extend the TRANSACTION→STORE path to TRANSACTION→STORE→INVENTORY→PRODUCT.

As a result there exist two nodes in the template labelled with the same table PRODUCT representing the two roles the table plays. Also, one node includes a child labelled with the table MANUFACTURER, the other node does not.

In the examples presented below only a single entity template is defined. This is only for ease of exposition as the system 100 may be implemented using a collection of entity templates 130.

Figure 2:
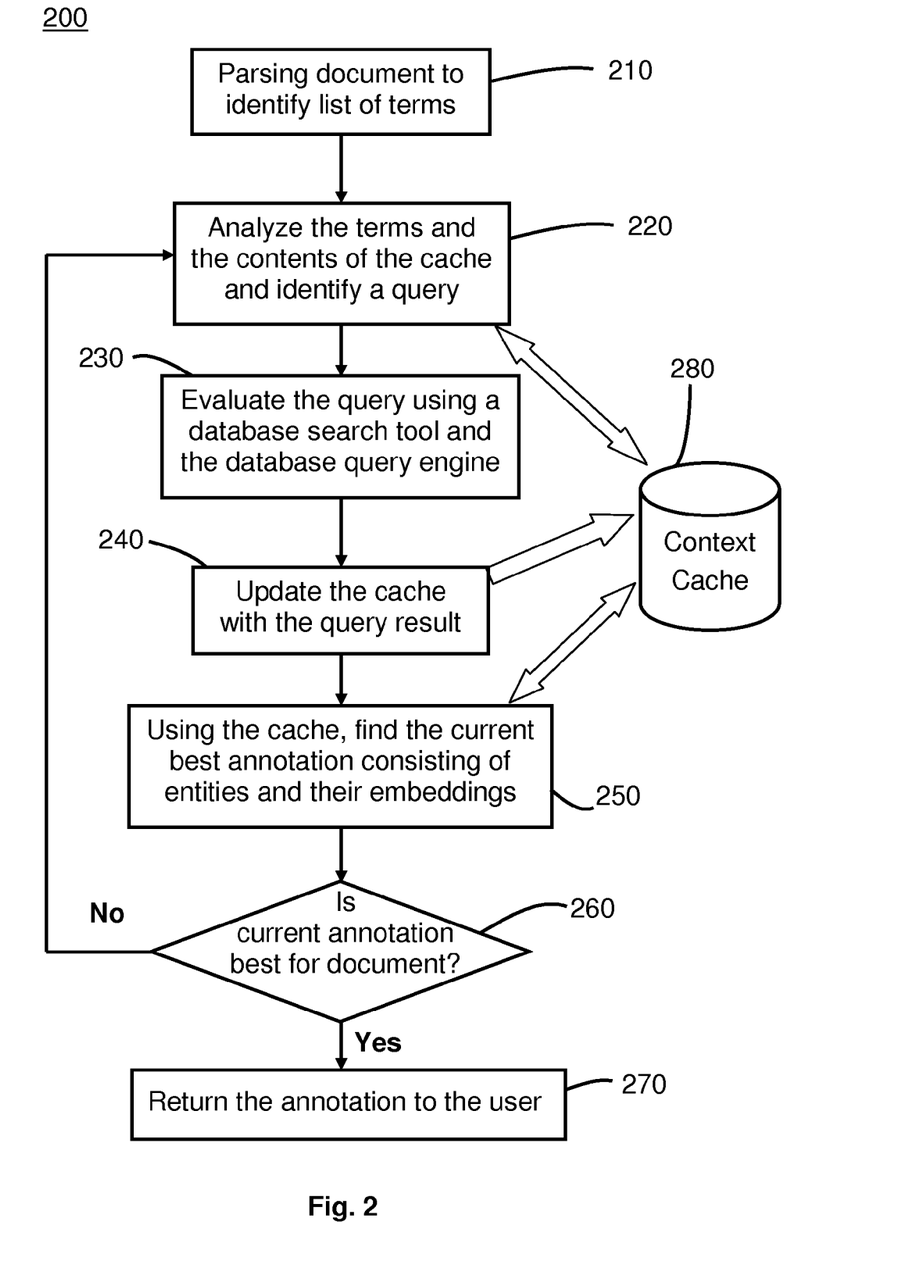
FIG. 2 shows a schematic flow diagram of a method performed by the system shown in FIG. 1.

The system 100 takes as input a text document 110, the database 120 and template 130. A set of entities along with their embedding is referred as an annotation. The system 100 uses a scoring function to measure the relevance of any given annotation to the document 110. The system 100 computes the annotation having the maximum score and outputs the document 110 associated with this annotation. The system 100 employs the method 200 for accomplishing the above task of finding the best annotation. FIG. 2 shows a schematic flow diagram of the method 200.

The method 200 starts in step 210 by parsing the text document 110. The system 100 uses a part-of-speech parser for identifying noun-phrases in the document 110 and filters out the rest of the words. The assumption, which usually holds, is that only nouns appear as values in the database 120. The identified noun-phrases are referred to as terms.

The system 100 maintains a context cache 280 that contains relationships of the form (e,t) meaning that the term t is contained in the context of the entity e. The system 100 starts with an empty cache.

In step 220 the system 100 analyzes the terms and the current contents of the context cache 280 and identifies a query that needs to be evaluated next. The query can be of two forms: (a) a term t; (b) an entity e. The goal of query (a) is to identify all the entities that contain the term t in their context, whereas query (b) asks for all terms contained in the context of the entity e.

Given the query identified in step 220, step 230 then evaluates the query using the database management system's query processing capability. Further, for queries of the form (a), a database search tool is also employed.

Step 240 updates the contents of the cache with the query result obtained in step 230.

Step 250 analyzes the contents of the cache and the document 110, and computes an annotation of the document that is the best with respect to the current contents of the cache.

Step 260 checks whether the annotation found in step 250 is the best annotation possible for the document 110. If so, the annotation is output to the user and the system 100 halts. If the current annotation is not the best annotation for the document 110 then the method 200 returns to step 220 from where steps 220 to 260 are repeated until the best annotation for the document 110 is found.

The method 200 is described in more detail below. The particular definition of annotation as used in the system 100 is described first. Next an example scoring function employed in system 100 for measuring the relevance of an annotation to the document 110 is described. Then the details of the method 200 are discussed.

The system 100 views the document 110 as a sequence of sentences, where each sentence is a collection of terms.

The preferred scoring mechanism is based on the well-known notion of inverse document frequency (IDF).

The weight of a term t is preferably defined as:

$$w(t) = \begin{cases} \log(N/n(t)) & \text{if } n(t) > 0 \\ 0 & \text{otherwise} \end{cases}$$

where N is the total number of distinct entities in the relational database 120, and n(t) is the number of distinct entities that contain term t in their context.

A segment is a sequence of one or more consecutive sentences in the document 110. In order to score a given document segment d with respect to a given entity e, let T(d) denote the set of terms that appear in the segment d, and let $T(e) \subset T(d)$ denote the set of such terms that appear in the context of entity e as well. Then, the score of the entity e with respect to the segment d is defined as:

$$\text{score}(e, d) = \sum_{t \in T(e)} tf(t, d) \cdot w(t)$$

where tf(t,d) is the number of times the term t appears in the segment d, and w(t) is the weight of the term t as defined in Equation (1).

Given input (a) a text document D (110), (b) a relational database 120, and (c) an entity template 130 that interprets the database as a set of entities E, annotations are defined as follows. An annotation is defined as a pair (F,B), where $F \subset E$ is a set of entities and B is an embedding of F in document D, i.e. a function that maps each entity $e \in F$ to a non-empty set of segments B(e) in document D such that the following property is satisfied: no two segments in S(F,B) overlap, where S(F,B) denotes the set of all segments included in the annotation (F,B), i.e. $S(F,B) = \cup_{e \in F} B(e)$.

The system 100 defines the score of an annotation (F,B) as:

$$\text{score}(F, B) = \sum_{e \in F} \sum_{d \in B(e)} (\text{score}(e, d) - \lambda)$$

where score(e,d) is as defined in Equation (2) and $\lambda \geq 0$ is a tuneable parameter that biases the score in favor of annotations with fewer segments.

System 100 outputs the annotation with the maximum score among all annotations of the document D. The system 100 accomplishes this task by using the method 200. A detailed description of the method 200 is presented below.

A naive algorithm for finding the best annotation is to enumerate all annotations, and pick the annotation that has the maximum score. This is clearly impractical since the number of possible annotations is exponential in the number of candidate entities as well as in the number of sentences in the document. The system 100 solves this problem efficiently by effectively pruning and transforming the search space. At the core of this solution lie the following two assertions:

Assertion 1. For each annotation (F,B), there exists an annotation (F',B') such that the segments in S(F',B') form a partition (i.e. a set of non-overlapping segments that cover each sentence in the document) of the document D and score $(F',B') \geq \text{score}(F,B)$.

Assertion 2. Let (F*,B*) be the annotation with the maximum score among all annotations of document D. Then, for each $e \in F^*$ and $d \in B^*(e)$, $\text{score}(e,d) \geq \text{score}(e',d)$ for all $e' \in E$.

For $1 \leq j \leq i \leq |D|$, let $D_{ji}$ denote the segment of the segment that starts at sentence j and ends at sentence i (inclusive of the two sentences). Let $(F_i, B_i)$ be the annotation of $D_{1i}$ having the maximum score.

Assertion 3. For each i, $1 \leq i \leq |D|$, the score for $(F_i, B_i)$ can be recursively expressed as $\text{score}(F_i, B_i) = \max_{0 \leq k < i} \{\text{score}(F_k, B_k) + \max_{e \in E} \text{score}(e, D_{(k+1)i}) - \lambda\}$, where |D| denotes the number of sentences in the document D.

The recursive relationship stated in assertion 3 suggests a dynamic programming algorithm for finding $(F_{|D|}, B_{|D|})$, the annotation of document D with the maximum score. This annotation, as stated in assertions 1 and 2, is actually an annotation with the maximum score overall. A top-down memorization-based version is used, the pseudocode of which appears in FIG. 6.

Figure 6:
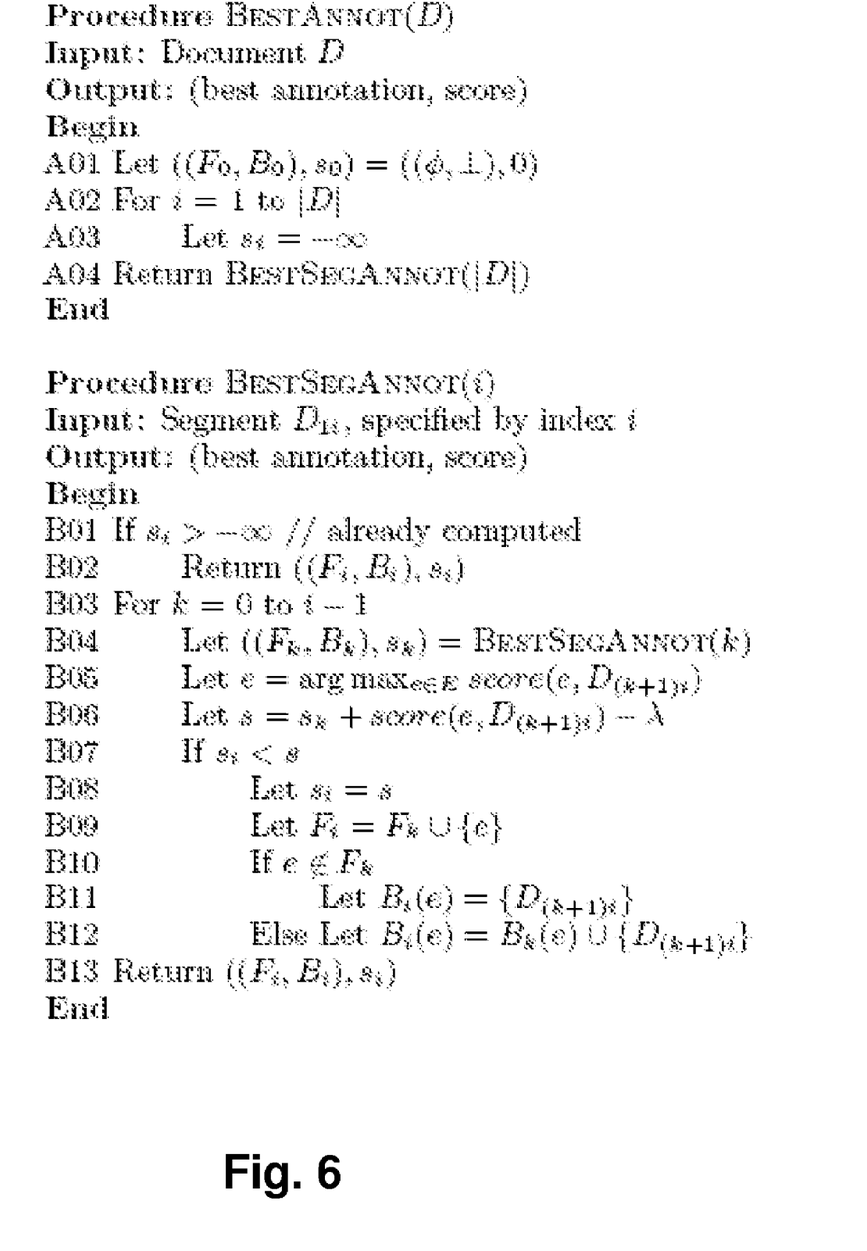
FIG. 6 shows pseodocode of an annotation computation algorithm.

The time complexity of the proposed algorithm shown in FIG. 6 is quadratic in the number of sentences in the document. This can be reduced to linear by limiting the size of the segments considered to be at most L sentences by changing the lower bound of k in Line B03 from 0 to max(0, i-L)). However, this efficient algorithm is not enough to make the solution scalable.

Finding the entity in E that best matches a given segment (Line B05) involves a search (rather than a simple lookup) on the database. This is an expensive operation for nontrivial database sizes, and performing it for every segment in the document is clearly a performance bottleneck.

The system 100 uses a refinement of the algorithm shown in FIG. 6 to resolve this performance bottleneck. The refined algorithm begins with no apriori information about the entities, and then successively queries the database to incrementally populate a cache, called context cache, of partial contexts of only the potentially matching entities as it converges to the final solution. At each step, the search for best matching entities is carried out using only the information in the cache at that step. This can be performed efficiently in-memory. The result is a strategy that keeps the amount of information retrieved from the database in course of the execution of the algorithm at a minimum.

The context cache maintains a set of entities $E_C \subset E$, a set of terms $T_C \subset T(D)$ (where T(D) is the set of terms in the document), and the following interrelations:

For each entity $e \in E_C$, a set $T_C(e) \subset T_C$ of terms from the context of entity e in the database. Let $T_C(e) = \phi$ for each $e \in E - E_C$.

For each term $t \in T_C$, a set $E_C(t) \subset E_C$ of entities that contain term t in their context. Let $E_C(t) = \phi$ for each $t \in T(D) - T_C$.

The context cache is populated with additional data using any of the following two operations.

GetEntitySet. Given a term $t \in T_C$, query the database to extract all the entities that contain term t in their context. This set is inserted in the cache as $E_C(t)$. Further, for each entity $e \in E_C(t)$, the set $T_C(e)$ is updated to include the term t if not already present.

GetTermSet. Given an entity $e \in E_C$, query the database to extract the set of all the terms in document D that exist in the context of that entity e. This set is inserted in the cache as $T_C(e)$. Further, for each term $t \in T_C(e)$, the set $E_C(t)$ is updated to include the entity e if not already present.

Both these operations are expensive. GetEntitySet involves (a) identifying the rows containing the term t across all tables labelling the nodes in the entity e, and (b) identifying the rows in the pivot table that have a join path (along the edges in the entity template) to any of the identified rows. Step (a) is performed using a text index over the tables in the database, while step (b) involves a union of multiple join queries, one for each node whose labelling table contains a row that contains the term t. The system 100 preferably exploits IBM's DB2 Net Search Extender for combined execution of both steps in a single query. Computing the context of an entity in GetTermSet, on the other hand, involves a join query based on the entity template. However, in the presence of a nested substructure, it is sometimes more efficient to retrieve the context using an outer-union query. Such are well-known in the Extensible Markup Language (XML) literature.

In order to bound the matching scores, consider a document segment d and let T(d) be the set of terms in document d. Further, let $E'_C$ denote the set of entities for which GetTermSet has been invoked so far, and let $T'_C$ denote the set of terms for which GetEntitySet has been invoked so far.

Then, for an entity $e \in E$, it is known that its context contains the terms in $T_C(e)$, but does not contain any of the terms in $(T'_C - T_C(e))$.

Now, consider the remaining terms in T(d), given by $R(e,d) = T(d) - (T'_C \cup T_C(e))$. If $e \in E'_C$, so that $T_C(e)$ contains the complete context of entity e obtained using GetTermSet, then it is further known that the context of entity e does not contain any of these terms as well. On the other hand, for the remaining entities $e \in E - E'_C$, there does not exist enough information to decide whether the context of entity e does or does not contain any of these terms. It is assumed that the entity e does not contain any of these terms to obtain a lower bound on score(e,d), and assumed that the entity e does contain of these terms to obtain an upper bound.

Accordingly, given an entity $e \in E$ and a segment d in document D, we compute the score lower-bound of entity e with respect to segment d by excluding the terms in the remaining terms R(e,d), i.e.:

$$score_C^-(e, d) = \sum_{t \in T_C(e)} tf(t, d) \cdot w(t)$$

and, the score upper-bound of entity e with respect to segment d by including the terms in the remaining terms R(e,d), i.e.:

$$score_C^+(e, d) = \begin{cases} \sum_{t \in T_C(e)} tf(t, d) \cdot w(t) & \text{if } e \in E'_C \\ \sum_{t \in T_C(e,d)} tf(t, d) \cdot w(t) & \text{if } e \notin E'_C \end{cases}$$

where $T_C(e,d) = T_C(e) \cup R(e,d)$.

The bounds on score(e,d) for $e \in E$ and segment d in document D derived above are further be used to derive a lower-bound $score_C^-(F,B)$ and an upper-bound $score_C^+(F,B)$ for a given annotation (F,B) of document D. These bounds follow from the definition of score(F,B) as follows:

$$score_C^-(F, B) = \sum_{e \in F} \sum_{d \in B(e)} (score_C^-(e, d) - \lambda)$$

$$score_C^+(F, B) = \sum_{e \in F} \sum_{d \in B(e)} (score_C^+(e, d) - \lambda)$$

The slack of the annotation (F,B) is derived as $slack_C(F,B) = score_C^+(F,B) - score_C^-(F,B)$. Let the slack of the entity e with respect to segment d further be defined as $slack_C(e,d) = score_C^+(e,d) - score_C^-(e,d)$. Since $slack_C(e,d) = 0$ for each entity $e \in E'_C$, it follows that:

$$slack_C(F, B) = \sum_{e \in F - E'_C} \sum_{d \in B(e)} slack_C(e, d)$$

In view of the foregoing, the algorithm that computes the best annotation (F*,B*) of a given document D presented in FIG. 6 may be refined. In particular, Lines B05 and B06 of the procedure BestSegAnnot in FIG. 6 has been adapted to invoke the score upper-bound function $score_C^+(e,d)$ instead of the exact score(e,d). Let the adapted procedure be called $BestSegAnnot_C$.

Let $(\overline{F},\overline{B})$ be the annotation returned by the procedure $BestSegAnnot_C$. The following assertion 4 is then made:

$$score_C^-(\overline{F},\overline{B}) \leq score(F^*,B^*) \leq score_C^+(\overline{F},\overline{B})$$

The cache content is iteratively improved so that the gap between the scores of the optimum annotation $(\overline{F},\overline{B})$ determined by the procedure $BestSegAnnot_C$ and the annotation (F*,B*) decreases monotonically. Suppose a cache update strategy is chosen that, at each step, (a) decreases $score_C^+(\overline{F},\overline{B})$ for all but a finite number of steps, and (b) ensures that $slack_C(F,B)$ does not increase for any annotation (F,B) that could be returned by the procedure $BestSegAnnot_C$ in the future. Then, since the total number of possible annotations are finite, the revised algorithm is bound to reach a stage when the procedure $BestSegAnnot_C$ determine an annotation $(\overline{F},\overline{B})$ such that $slack_C(\overline{F},\overline{B}) = 0$, at which point the revised algorithm may terminate because, according to assertion 4, $(\overline{F},\overline{B})$ would then be the overall optimal annotation.

Figure 7:
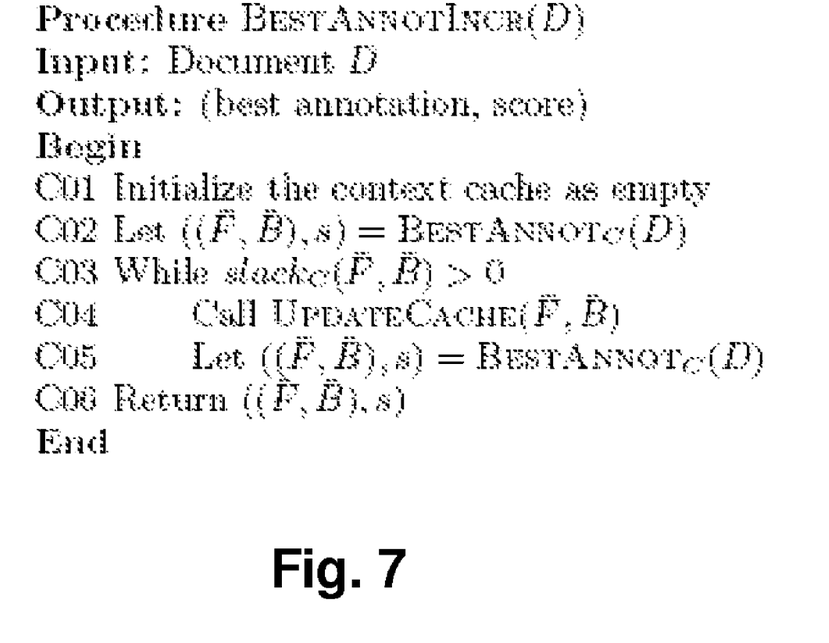
FIG. 7 shows pseodocode of a revised annotation computation algorithm.

The resulting procedure, called BestAnnotIncr is shown in FIG. 7. Starting with an empty cache, the procedure BestAnnotIncr repeatedly calls the procedure $BestAnnot_C$, which computes a best matching annotation $(\overline{F},\overline{B})$ based on the current cache, and then calls a subroutine UpdateCache described below, that updates the cache using the best matching annotation $(\overline{F},\overline{B})$. The procedure BestAnnotIncr terminates whenever it is found that the best annotation $(\overline{F},\overline{B})$ returned by the modified procedure BestAnnot has $slack_C(\overline{F},\overline{B}) = 0$.

Since $score^+(e,d)$ is computed in-memory based on the contents in the context-cache, each invocation to the procedure $BestAnnot_C$ is executed efficiently. In fact, since $score^+(e,d)$ for most segments d and entities e remains the same between successive invocations of the procedure $BestAnnot_C$, the system 100 actually uses lazy, incremental techniques to compute the successive best annotations efficiently.

The heuristic strategy used in system 100 for choosing the update to perform on the cache at a given iteration in the revised best annotation algorithm (cf. Line C04 in FIG. 7) is next described. Let the best annotation determined by the procedure $BestAnnot_C$ on the current cache contents be $(\overline{F},\overline{B})$. By definition of $BestAnnot_C$, $(\overline{F},\overline{B}) = \operatorname{argmax}_{(F,B)} score_C^+(F,B)$. Let the corresponding score upper bound be $s_0 = score_C^+(\overline{F},\overline{B})$. After the cache has been updated, let $s_1$ be the new score upper-bound for $(\overline{F},\overline{B})$.

The system 100 operates by heuristically choosing an update that tries to maximize $(s_0 - s_1)$, the decrease in $score_C^+(\overline{F},\overline{B})$. This is achieved by growing the cache using GetEntitySet(t) or GetTermSet(e) for an appropriate term $t \notin T'_C$ or entity $e \notin E'_C$. Since (a) $s_1 < s_0$, and (b) growing the cache can only decrease the slack for an annotation, the two conditions mentioned above for guaranteeing termination of the algorithm are satisfied.

The maximum decrease in $score_C^+(\overline{F},\overline{B})$ is bound by $slack_C(\overline{F},\overline{B})$. Consider a segment d in $(\overline{F},\overline{B})$. Since $(\overline{F},\overline{B})$ is a canonical annotation, segment d must be associated with a unique entity $e=\arg \max_{e' \in E_C} score_C^+(e',d)$. The contribution of this segment d to $slack_C(\overline{F},\overline{B})$, is thus $slack_C(e,d)$. Let $\overline{d}$ be the segment in $(\overline{F},\overline{B})$ with the largest contribution to $slack_C(\overline{F},\overline{B})$ and $\overline{e}$ be the entity associated with segment $\overline{d}$. The system 100 tries to achieve the goal of decreasing $score_C^+(\overline{F},\overline{B})$ by greedily choosing to decrease $score_C^+(\overline{e},\overline{d})$ instead.

There are two alternatives for updating the cache. The first, called GES, invokes GetEntitySet(t) for a carefully identified term $t \in T(\overline{d})$, and the other, called GTS, invokes GetTermSet(e) for a carefully identified entity $e \in E_C$. Each is explored in turn and the term t and entity e respectively that lead to the maximum decrease in $score_C^+(\overline{e},\overline{d})$ are identified.

GES. As already stated, $slack_C(\overline{e},\overline{d})=score_C^+(\overline{e},\overline{d})-$ $$score_C^-(\overline{e},\overline{d}) = \sum_{t \in R(\overline{e},\overline{d})} tf(t, \overline{d}).w(t),$$

where $R(\overline{e},\overline{d})$ is the set of terms in segment $\overline{d}$ that may or may not belong to the context of $\overline{e}$. Let $\overline{t}$ be the term in set $R(\overline{e},\overline{d})$ with the highest contribution to $slack_C(\overline{e},\overline{d})$, i.e. $\overline{t}=\arg \max_{t \in R(\overline{e},\overline{d})} tf(t,\overline{d}) \cdot w(t)$. In the computation of $score_C^+(\overline{e},\overline{d})$ before the update, term $\overline{t}$ is assumed to be in the context of entity $\overline{e}$. If the cache is updated by invoking GetEntitySet($\overline{t}$), and it is found that term $\overline{t}$ is actually not in the context of entity $\overline{e}$, then it would lead to the largest decrease in $score_C^+(\overline{e},\overline{d})$ possible by invoking GetEntitySet(t) on any term t. The operation GES thus involves invoking GetEntitySet($\overline{t}$).

GTS. Since the $score_C^+(\overline{e},\overline{d})$ has the be decreased through choosing entity $\overline{e}$, the operation GTS invokes GetTermSet($\overline{e}$). The maximum decrease in $score_C^+(\overline{e},\overline{d})$ obtained using GES is $tf(\overline{t},\overline{d}) \cdot w(\overline{t})$, and $slack_C(\overline{e},\overline{d})$ using GTS. Since the latter is always the larger of the two, this seems to suggest that GTS should always be invoked in preference to GES. This is misleading.

Let the cache be called complete with respect to a segment d if all potentially best matching entities for segment d are present in $E_C$. If the cache is not complete with respect to segment $\overline{d}$ it may not yet know about the entity that is actually a best match for segment $\overline{d}$, and therefore invoking GTS on segment $\overline{d}$ does not help.

At each step, the system 100 therefore checks whether the cache is complete with respect to the identified segment $\overline{d}$. If the condition is true, the system 100 invokes GTS, otherwise the system 100 invokes GES. The challenge in implementing this strategy lies in checking whether the cache is complete. The following assertion 5 provides a simple solution.

Assertion 5. Let d be a segment and let $e \in E_C$ be its associated entity in the annotation $(\overline{F},\overline{B})$, i.e. $e=\arg \max_{e' \in E_C} score_C^+(e',d)$. If $$\sum_{t \in T(d)-T_C'} tf(t, d).w(t) < score_C^-(e, d),$$

then the cache is complete with respect to segment d.

Figure 8:
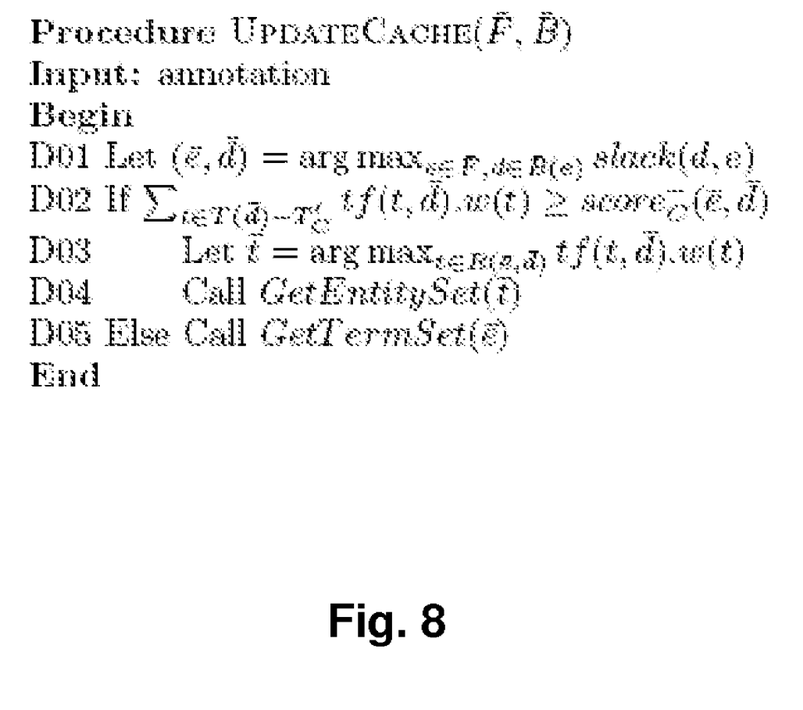
FIG. 8 shows pseodocode for a cache update procedure.

The pseudocode for a cache update procedure Update-Cache is shown in FIG. 8. The system 100 may also implement an alternative version of the procedure UpdateCache that batches all executions of GES together. On its first call, this version of the procedure UpdateCache keeps invoking GES on segment $\overline{d}$ until the cache becomes complete with respect to segment $\overline{d}$, and in all subsequent calls invokes GTS.

Figure 3A:
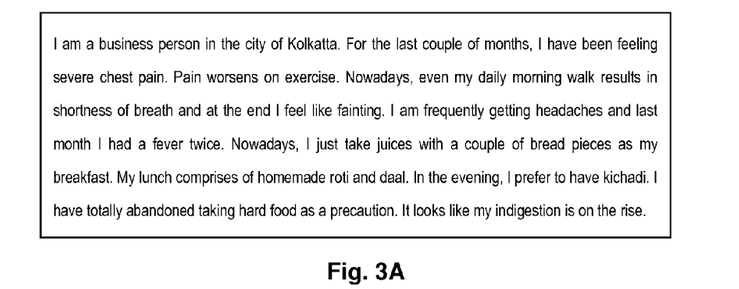
FIG. 3A shows an example report from a patient used to illustrate the operation of the system shown in FIG. 1.

The system 100 and the method 200 performed therein is further illustrated by means of an example relating to hospitals. The system 100 receives as input a text document, such as the report shown in FIG. 3A from a patient that talks about various symptoms suffered by the patient. The report includes other information, such as the city where he/she lives.

Figure 3B:
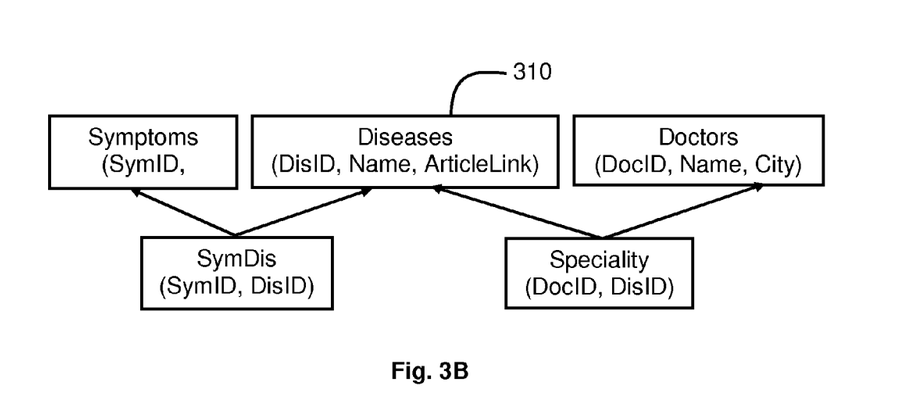
FIG. 3B shows an example schema of structure data.

The schema of the structure data, which contains information about various diseases, their symptoms, doctors and diseases treated by each doctor, is shown in FIG. 3B. An edge represents a foreign key to primary key relationship. The attribute "ArticleLink" in the Diseases table 310 contain a link to an article discussing the particular disease.

Figure 3C:
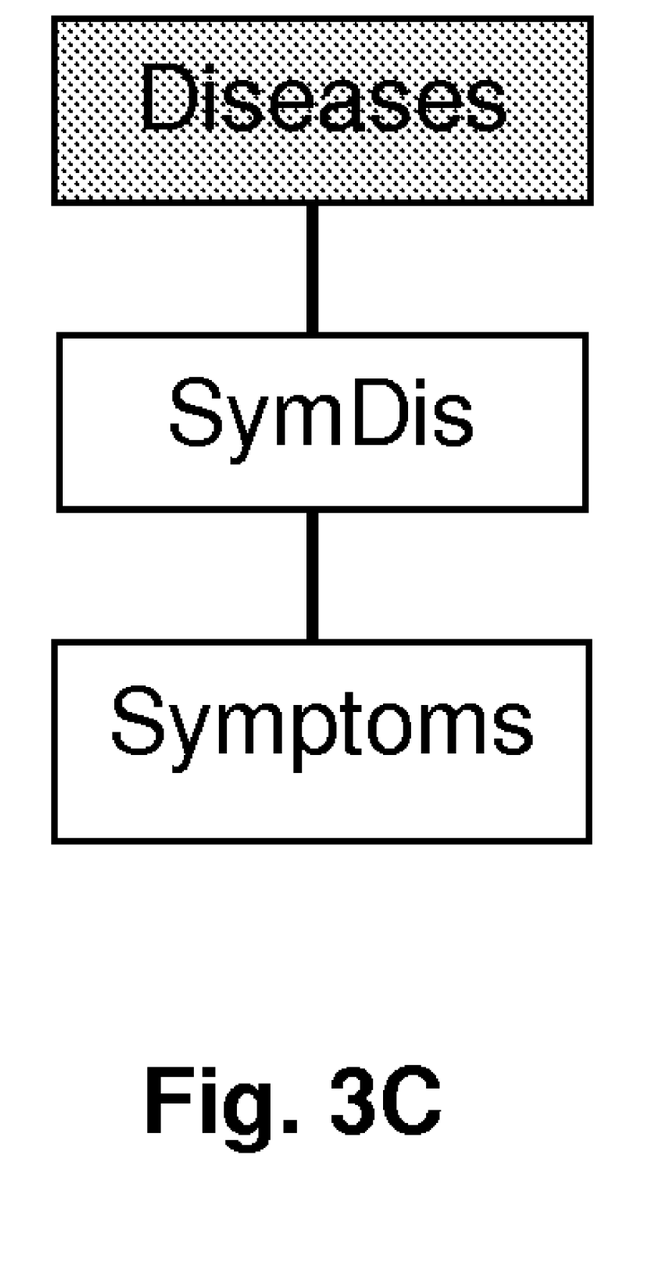
FIG. 3C shows an example entity template corresponding to the schema in shown in FIG. 3B.

Entity templates are defined by a user or a domain expert. The entity template for the present example is shown in FIG. 3C. The relation "Diseases" is the pivot of the entity template, meaning that possible diseases related to the input document are to be identified.

The goal of the system 100 is to process the input text document (FIG. 3A) and to identity possible diseases suffered by the patient. Having received the input, the system 100 parses the text document, and by ignoring uninteresting words, identifies a list of terms. For example, from the segment of the input text document " . . . Pain worsens on exercise. Nowadays, even my daily morning walk results in shortness of breath and at the end I feel like fainting . . . " the terms identified are: pain; worsens; exercise; morning; walk; results; shortness; breath; fainting.

Based on the identified terms, the system 100 employs the above described method 200 to find the diseases that are most relevant to the document and their embeddings in the documents. The results are returned to the user.

In summary, the system 100 of the present disclosure addresses the problem of associating the relevant structured data 120 with the input text document 110 by discovering the entities hidden in the document 110 with the help of the structured data 120. The system 100 uses partial information present in the input document 110 (in the form of terms present in the document 110) to discover entities in the structured database 120 that pertain to the document 110.

The system 100 is able to identify an entity in the given text document 110 even if that entity is not explicitly mentioned in the document 110 because the system 100 exploits the available context information to match and identify the entities. The terms in the text document 110 matching an entity may be arbitrarily spread out in the document 110. In the course of identifying the best matching entities, multiple terms across the document 110 are identified as belonging to the same entity. It is noted that the number of entities present in the document 110, or their relative order, is not known beforehand.

Figure 5:
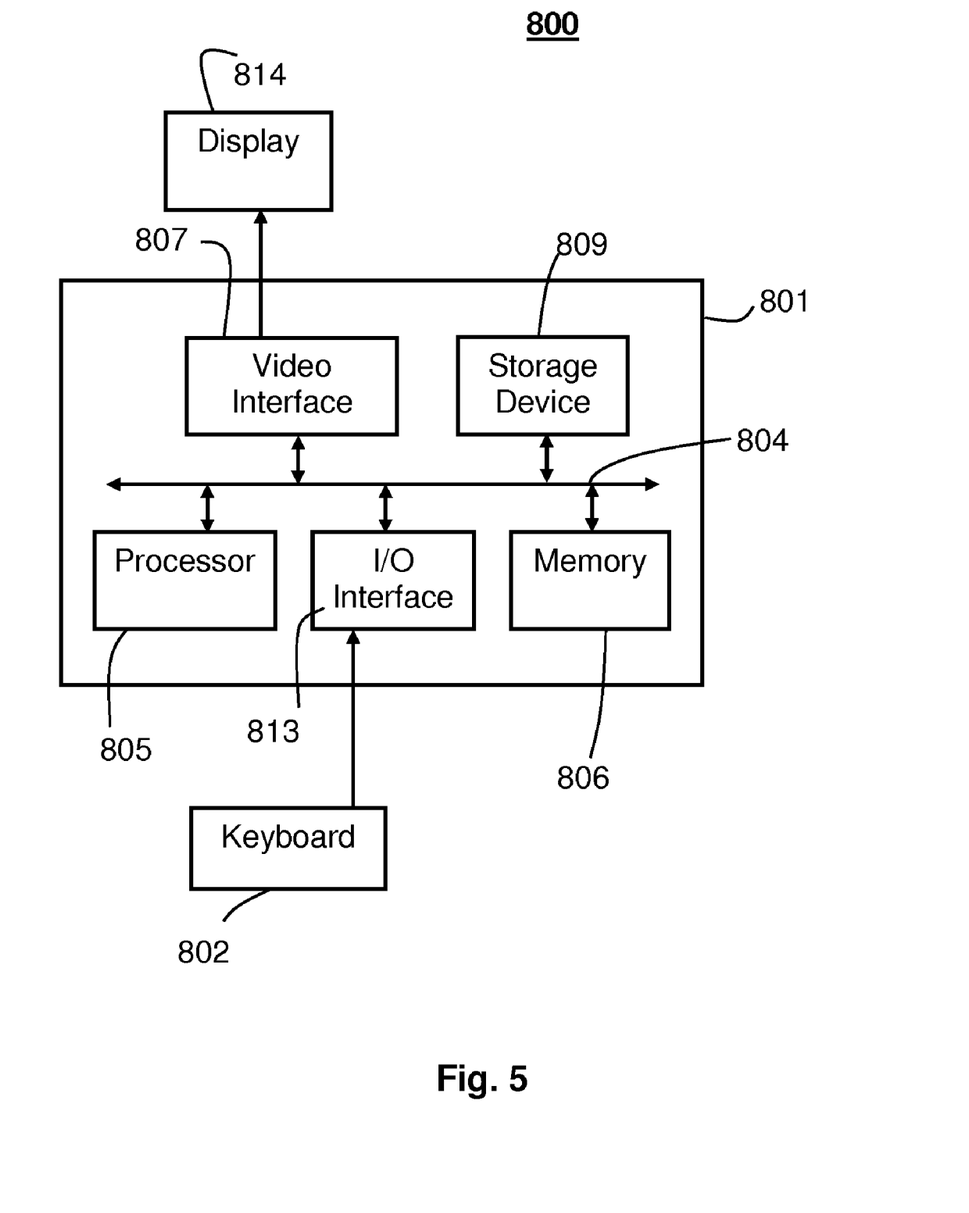
FIG. 5 shows a schematic block diagram of a general purpose computer upon which arrangements described can be practiced.

The system 100 for linking a given text document with relevant structured data may be practiced using a general-purpose computer system 800, such as that shown in FIG. 5 wherein the processes within system 100 are implemented as software, such as an application program executing within the computer system 800. The software may be stored in a computer readable medium. The software is loaded into the computer system 800 from the computer readable medium, and then executed by the computer system 800. A computer readable medium having such software or computer program recorded on it is a computer program product.

The computer system 800 is formed by a computer module 801, input devices such as a keyboard 802, output devices including a display device 814. The computer module 801 typically includes at least one processor unit 805, and a memory unit 806. The module 801 also includes a number of input/output (I/O) interfaces including a video interface 807 that couples to the display device 814, and an I/O interface 813 for the keyboard 802. A storage device 809 is provided and typically includes at least a hard disk drive and a CD-ROM drive. The components 805 to 813 of the computer module 801 typically communicate via an interconnected bus 804 and in a manner which results in a conventional mode of operation of the computer system 800 known to those in the relevant art.

Typically, the application program is resident on the storage device 809 and read and controlled in its execution by the processor 805. In some instances, the application program may be supplied to the user encoded on a CD-ROM or floppy disk and read via a corresponding drive, or alternatively may be read by the user from a network via a modem device. Still further, the software can also be loaded into the computer system 800 from other computer readable media. The term "computer readable medium" as used herein refers to any storage medium that participates in providing instructions and/or data to the computer system 800 for execution and/or processing.

The foregoing describes only some embodiments of the present invention, and modifications and/or changes can be made thereto without departing from the scope and spirit of the invention, the embodiments being illustrative and not restrictive.

What is claimed is:

1. A computer-implemented method of associating unstructured text data from a text document with structured data from a relational database, said method comprising:
    receiving and parsing, by a computer, said text document to identify terms, each of said terms comprising a noun phrase;
    identifying, by said computer, entities and context information for said entities in a form of entity templates received from said structured data in said relational database, each of said entity templates comprising a rooted tree with each node of said rooted tree labeled with a table, an edge existing between nodes of said rooted tree when tables labeling said nodes have a foreign-key relationship in a relational schema, each tuple labeling a root node of any of said entity templates constituting an entity, and said context information for said entity comprising tuples having a path between said nodes having said foreign-key relationship to said entity;
    finding, by said computer, embeddings corresponding to each of said entities in said text document, said embeddings mapping each of said entities to a nonempty set of segments of said text document, each of said set of segments comprising one or more consecutive sentences in said text document; and
    searching and querying said relational database based on said terms to determine an annotation, said annotation comprising mappings of each of said entities to non-overlapping segments of said text document, said score being based on an inverse document frequency of said terms in each of said segments of said text document and said terms
    searching and querying said relational database based on said terms to determine an annotation with a maximum score, said annotation comprising mappings of each of said entities in said partitioning to non-overlapping segments of said text document, said maximum score being based on an inverse document frequency of said terms in each of said segments of said text document and said terms associated with said context information associated with said entity embedded in each of said segments; and
    outputting, by said computer, said partitioning of said annotation with said maximum score.

2. The method according to claim 1, said annotation being determined by steps comprising:
    maintaining a context cache comprising containment relationships between said entities and said terms, each containment relationship comprising an entity-term pair, said term of said entity-pair being related to said context information of said entity by said foreign-key relationship;
    based on said containment relationships present in said context cache, issuing a query to said relational database based on contents of said context cache to identify further containment relationships between said entities and said terms;
    updating said context cache with results from said query;
    finding a current best annotation based on said context cache; and
    repeatedly issuing queries, updating said context cache, and finding a next current best annotation, until said annotation having said maximum score is found.

3. A method of associating unstructured text data from a text document with structured data from a relational database comprising:
    receiving and parsing, using a computer, said text document to identify terms, each of said terms comprising a noun phrase;
    identifying, using said computer, entities and context information for said entities in a form of entity templates received from said structured data in said relational database, each of said entity templates comprising a rooted tree with each node of said rooted tree labeled with a table, an edge existing between nodes of said rooted tree when tables labeling said nodes have a foreign-key relationship in a relational schema, each tuple labeling a root node of any of said entity templates constituting an entity, and said context information for said entity comprising tuples having a path between said nodes having said foreign-key relationship to said entity;
    finding, using said computer, embeddings corresponding to each of said entities in said text document, said embeddings mapping each of said entities to a nonempty set of segments of said text document, each of said set of segments comprising one or more consecutive sentences in said text document;
    searching and querying said relational database based on said terms to determine an annotation with a maximum score, said annotation comprising mappings of each of said entities to non-overlapping segments of said text document, said maximum score being based on an inverse document frequency of said terms in each of said segments of said text document and said terms associated with said context information associated with said entity embedded in each of said segments; and
    outputting, using said computer, said annotation with said maximum score for said text document.

4. The method according to claim 3, said annotation with said maximum score being determined by steps comprising:
    maintaining a context cache comprising containment relationships between said entities and said terms, each containment relationship comprising an entity-term pair, said term of said entity-pair being related to said context information of said entity by said foreign-key relationship;
    based on said containment relationships present in said context cache, issuing a query to said relational database based on contents of said context cache to identify further containment relationships between said entities and said terms;

updating said context cache with results from said query;

finding a current best annotation based on said context cache; and repeatedly issuing queries, updating said context cache, and finding a next current best annotation, until said annotation having said maximum score is found.

5. A computer-implemented method of partitioning a text document including unstructured text data into segments with respect to structured data from a relational database, said method comprising:

receiving and parsing, by a computer, said text document to identify terms, each of said terms comprising a noun phrase;

identifying, by said computer, entities and context information for said entities in a form of entity templates received from said structured data in said relational database, each of said entity templates comprising a rooted tree with each node of said rooted tree labeled with a table, an edge existing between nodes of said rooted tree when tables labeling said nodes have a foreign-key relationship in a relational schema, each tuple labeling a root node of any of said entity templates constituting an entity, and said context information for said entity comprising tuples having a path between said nodes having said foreign-key relationship to said entity;

finding, by said computer, embeddings corresponding to each of said entities in said text document, said embeddings mapping each of said entities to a partitioning of said text document into a nonempty set of segments, each of said set of segments comprising one or more consecutive sentences in said text document;

based on said containment relationships present in said context cache, issuing a query to said relational database based on contents of said context cache to identify further containment relationships between said entities and said terms;

updating said context cache with results from said query;

finding a current best annotation based on said context cache; and repeatedly issuing queries, updating said context cache, and finding a next current best annotation, until said annotation having said maximum score is found.

6. The method according to claim 5, said annotation with said maximum score being determined by steps comprising:

maintaining a context cache comprising containment relationships between said entities and said terms, each containment relationship comprising an entity-term pair, said term of said entity-pair being related to said context information of said entity by said foreign-key relationship;

associated with said context information associated with said entity embedded in each of said segments.

* * * * *